United States Patent [19]

Nakayama et al.

[11] Patent Number: 5,002,813

[45] Date of Patent: Mar. 26, 1991

[54] SUBSTRATE WITH PROTECTIVE FILM AND METHOD OF MANUFACTURING OPTICAL MEMORY DEVICE USING THE SAME

[75] Inventors: Junichiro Nakayama; Kenji Ohta; Hiroyuki Katayama; Akira Takahashi, all of Nara; Yoshiteru Murakami, Nishinomiya, all of Japan

[73] Assignee: Sharp Kabushiki Kaisha, Osak, Japan

[21] Appl. No.: 384,254

[22] Filed: Jul. 21, 1989

[30] Foreign Application Priority Data

Aug. 1, 1988 [JP] Japan ................................ 63-192386

[51] Int. Cl.$^5$ .............................................. B32B 3/02
[52] U.S. Cl. ......................................... 428/64; 428/65; 428/76; 428/412; 428/913; 369/211; 346/761; 346/135.1; 430/495; 430/945; 156/60; 427/162
[58] Field of Search .................. 428/64, 65, 412, 913, 428/76; 369/288; 346/762, 135.1; 430/495, 945; 156/60; 427/162

[56] References Cited

FOREIGN PATENT DOCUMENTS 0043845  2/1987  Japan .
0188043  8/1987  Japan .
0034750  2/1988  Japan .
3050935  3/1988  Japan .

Primary Examiner—Patrick J. Ryan
Attorney, Agent, or Firm—Cohen, Pontani & Lieberman

[57] ABSTRACT

A substrate for manufacturing an optical memory device includes one surface covered with a protective film provided with openings only in portions corresponding to recording layers to be formed on the substrate, thereby allowing the protective film to function as a mask for forming the recording layers in a recording layer forming process. Also disclosed is a method of manufacturing an optical memory device including the steps of continuously feeding a substrate covered with a protective film provided with openings only in portions corresponding to recording layers to be formed on the substrate, forming the recording layers through the openings on the substrate, forming guide tracks on the substrate, stripping the protective film from the substrate, cutting the substrate to a predetermined size, and forming a protective layer on the substrate.

4 Claims, 2 Drawing Sheets

FIG. 3(a) (PRIOR ART)    FIG. 3(b) (PRIOR ART)    FIG. 3(c) (PRIOR ART)
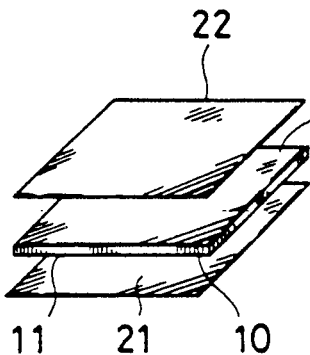
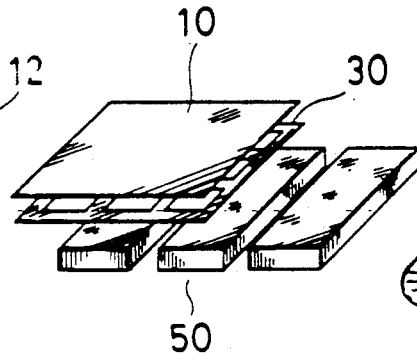
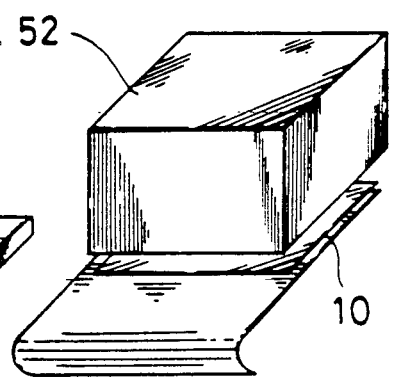
FIG. 4 (PRIOR ART)
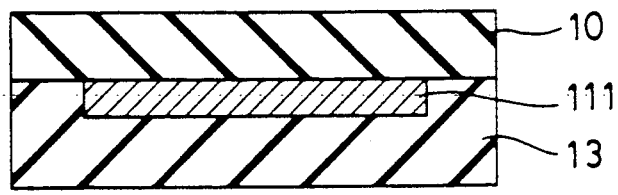
FIG. 5 (PRIOR ART)
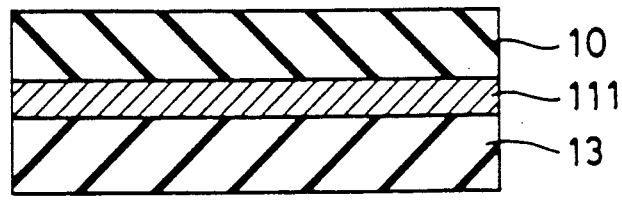

SUBSTRATE WITH PROTECTIVE FILM AND METHOD OF MANUFACTURING OPTICAL MEMORY DEVICE USING THE SAME

BACKGROUND OF THE INVENTION

1. Field of the Invention

The present invention relates to a substrate with a protective film used for manufacturing an optical memory device represented by an optical card or an optical disc, and a method of manufacturing an optical memory device using the same.

2. Description of the Prior Art

A conventional substrate with a protective film for manufacturing an optical memory device (merely referred to as substrate 10 hereinafter) will be described with reference to FIGS. 3 and 5.

A ROM type optical memory device used for reproduction (i.e. read only) is commercialized as a CD (compact disk), a CD-ROM (compact disk read only memory), and a VD (video disk). In addition, the development of a writable and erasable optical memory device has proceeded rapidly.

An optical memory device such as an optical card is a substrate 10 having recording layers 111 serving as recording regions formed thereon. Laser light or the like is applied to the recording layers 111 to carry out reading or recording (see U.S. Pat. No. 4,544,835 and No. 4,680,460).

Both surfaces 11 and 12 of the substrate 10 on which the recording layers 111 are formed for an optical memory device are respectively covered with protective films 21 and 22. The protective films 21 and 22 are used for protecting the surfaces 11 and 12 of the substrate 10 from being damaged before the recording layers 111 are formed.

This substrate 10 is fed into an optical memory device manufacturing apparatus after the protective films 21 and 22 are stripped therefrom (see FIG. 3(a)). The substrate 10 is then fed to a recording layer forming process station 50 after only portions, corresponding to the recording layers 111 to be formed on the substrate 10, of the substrate are covered with a mask 30 provided with openings in the manufacturing apparatus. In this recording layer forming process station 50, the recording layers 111 are formed on the surface 11 of the substrate 10 (see FIG. 3(b)). Thereafter, the substrate 10 becomes an optical memory device through a plurality of processes such as a guide track forming process station 51 (see FIG. 3(c)) for forming guide tracks, a cutting process station 52 (see FIG. 3(c)) using a cutter, and a protective layer forming process station (not shown) for forming a protective layer 13 made of transparent synthetic resins.

Furthermore, when the recording layers 111 are formed without covering the surface 11 of the substrate 10 with the mask 30, the recording layers 111 are formed over the entire surface of the substrate 10 as shown in FIG. 5. Thus, even if the protective layer 13 is formed on the recording layers 111, the recording layers 111 are directly exposed to the external air along the edges of the substrate 10. Accordingly, the substrate 10 becomes an optical memory device that is inferior in resistance to the enviroment.

Since the above described conventional mask is formed like a plate, optical memory devices can not be continuously manufactured from a longitudinal sheetlike substrate such as a flexible substrate. In addition, if the mask is not used, the substrate 10 becomes an optical memory device that is inferior in resistance to the environment as described above. More specifically, in the conventional substrate with a protective film for manufacturing an optical memory device, the mask is an indispensable element. Accordingly, the manufacture of optical memory devices using the conventional substrate with a protective film for manufacturing a conventional optical memory device is low in production efficiency, making it difficult to reduce costs.

SUMMARY OF THE INVENTION

The present invention provides a substrate for manufacturing an optical memory device, one surface of the substrate being covered with a protective film provided with openings in only portions corresponding to recording layers to be formed on the substrate, thereby allowing the protective film to function as a mask for forming the recording layers in a recording layer forming process, and a method of manufacturing an optical memory device, which comprises the steps of continuously feeding a substrate covered with a protective film provided with openings in only portions corresponding to recording layers to be formed on the substrate, forming the recording layers through the openings on the substrate, forming guide tracks on the substrate, stripping the protective film from the substrate, cutting the substrate to a predetermined size, and forming a protective layer on the substrate.

It is desirable that both surfaces of the above described substrate are covered with protective films and that one of the protective films is provided with openings.

According to the present invention, the surface of the substrate is previously covered with the protective film functioning as a mask, so that no mask is required at the time of manufacturing an optical memory device. Thus, optical memory devices can be continuously manufactured and, consequently, production efficiency can be increased to reduce cost.

BRIEF DESCRIPTION OF THE DRAWINGS

FIG. 3 is a schematic diagram for explaining the steps of manufacturing an optical memory device using a conventional substrate with a protective film for manufacturing an optical memory device;

FIG. 4 is a cross-sectional view showing an optical memory device in a case in which a mask is used in the conventional substrate with a protective film for manufacturing an optical memory device; and FIG. 5 is a cross-sectional view showing an optical memory device in a case in which the mask is not used.

DESCRIPTION OF THE PREFERRED EMBODIMENTS

Figure 1:
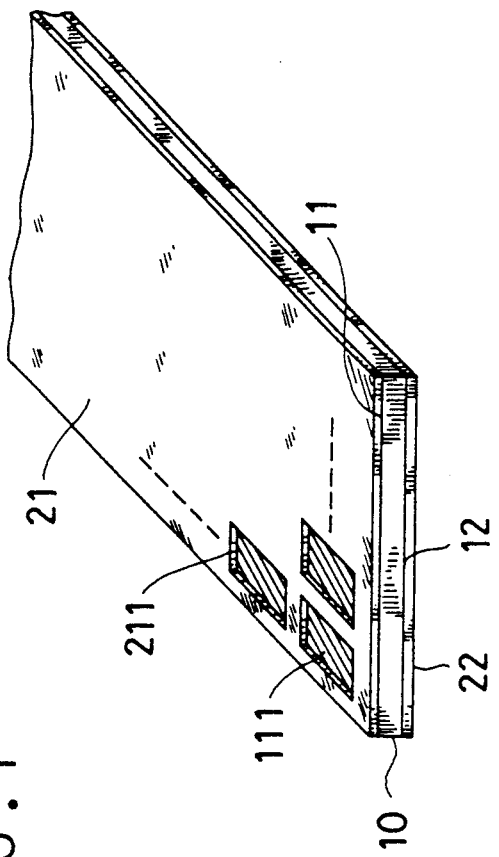
FIG. 1 is a perspective view showing an embodiment of a substrate with a protective film for manufacturing an optical memory device according to the present invention.

The present invention provides a substrate for manufacturing an optical memory device, one surface of the substrate being covered with a protective film provided with openings in only those portions corresponding to recording layers to be formed on the substrate, thereby allowing the protective film to function as a mask for forming the recording layers in a recording layer forming process, and a method of manufacturing an optical memory device, which comprises the steps of continuously feeding a substrate covered with a protective film provided with openings in only those portions corresponding to recording layers to be formed on the substrate, forming the recording layers through the openings on the substrate, forming guide tracks on the substrate, stripping the protective film from the substrate, cutting the substrate to a predetermined size, and forming a protective layer on the substrate.

The above described protective film can be made of vinyl, polyethylene, nylon, Duracon, polypropylene, acetate, polyester or ABS resins each having a thickness of approximately 0.01 to 0.3 mm.

A sheet made of polycarbonate resins, acrylic resins or polyolefin resins each having a thickness of approximately 0.2 to 1.0 mm is used as the above described substrate.

The above described substrate with protective film is preferably manufactured using a method of bonding protective films to both surfaces of the substrate at a temperature of 100° C. or less by thermocompression using a thermocompression roll.

Furthermore, the method of manufacturing the substrate with protective film includes a method of bonding a protective film to a substrate with an adhesive containing synthetic rubber having weak adhesion, a method of adhering a protective film to a substrate by a static electric charge, and a method of spraying or applying on the surface of a substrate coating agents composed of a mixture of methyl isobutyl and toluene or coating agents containing silicon to form a protective film.

The openings are provided on the protective film preferably by press working or the like before the protective film is adhered to the substrate.

Furthermore, the method of providing the opening on the protective film adhered to the substrate may include a method of pressurizing a substrate having a protective film adhered thereto by a roll comprising cutting edges corresponding to openings to form cuts on the protective film and, then, removing the protective film corresponding to the openings by suction, adhesion or catching.

Additionally, when the protective film is formed using coating agents, the coating agents are sprayed on substrate after a mask corresponding to openings is located on the substrate, thereby allowing a protective film having openings to be formed on the substrate, or the coating agents are applied (printed) on a substrate using a roller having concave portions corresponding to openings on its cylindrical surface, thereby allowing a protective film having openings to be formed on the substrate.

A sputtering process, a vacuum evaporation process, a spray process or the like which is known in the art can be used for forming the above described recording layers.

In addition, the recording layer formed by the sputtering process and the vacuum evaporation process is preferably, for example, an RE-TM magnetic thin film with perpendicular magnetization containing TbFeCo, GdTbFe, NdDyFeCo, TbFe or GdTbFeCo.

Furthermore, the recording layer formed by the spray process is made of photochromic materials, organic dystuff materials or the like.

An embodiment of the present invention will next be described with reference to FIGS. 1 and 2.

Figure 2:
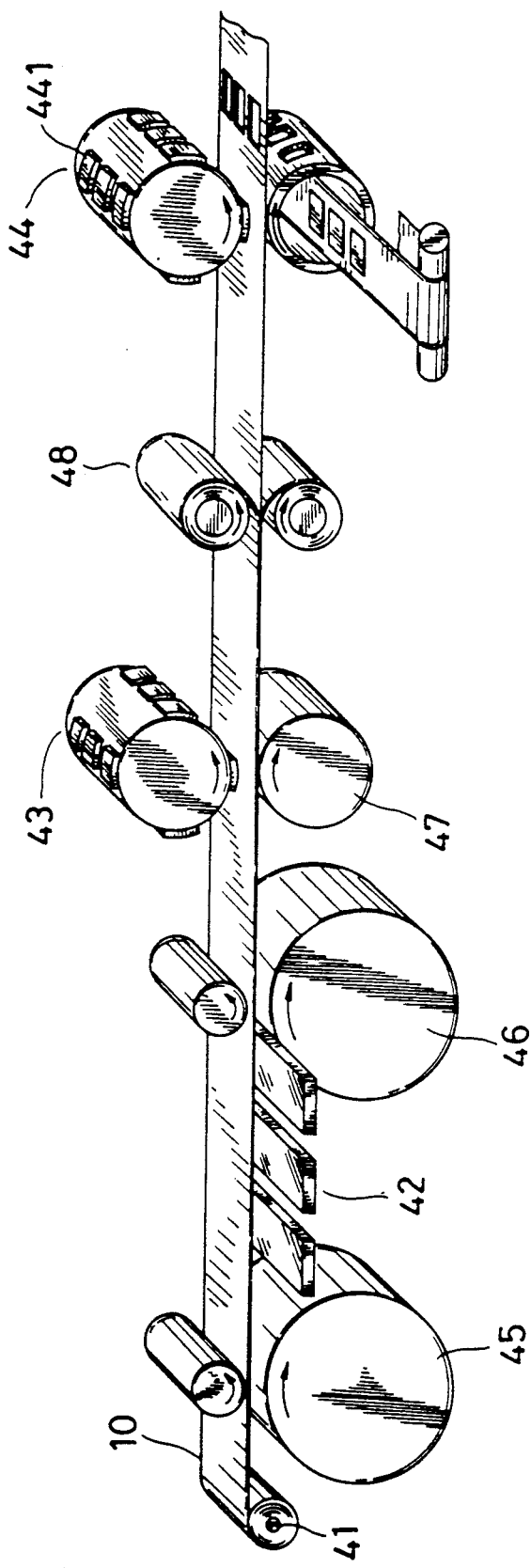
FIG. 2 is a schematic diagram showing a structure of an apparatus for manufacturing an optical memory device using the substrate with a protective film for manufacturing an optical memory device according to the present invention.

FIG. 1 is a perspective view showing an embodiment of the substrate with a protective film for manufaturing of an optical memory device according to the present invention, and FIG. 2 is a schematic diagram showing a structure of an apparatus for manufaturinng an optical memory device using the substrate with a protective film for manufacturing an optical memory device according to the present invention. For convenience of illustration, the thickness of the protective film is exaggerated in FIG. 1.

A substrate 10 has fexibility and is made of transparent resins such as polycarbonate resins, both surfaces 11 and 12 thereof being respectively covered with protective films 21 and 22. The protective film 21 covering the surface 11 of the substrate 10 is provided with openings 211. The position of the openings 211 is set corresponding to positions where recording layers 111 are to be formed on the substrate 10. On the other hand, the protective film 22 covers over the entire surface 12 of the substrate 10. Meanwhile, the thickness of the substrate 10 is preferably set at approximately 0.2 to 1.0 mm but is given not by way of limitation.

The protective films 21 and 22 are preferably ones having a heat resisting temperature higher than the temperature at which the recording layers 111 are formed on the substrate 10 and having almost the same coefficient of thermal expansion as that of the substrate 10. For example, one satisfying the above described conditions is suitably selected out of synthetic resins such as vinyl, polyethylene nylon, Duracon, polypropylene, acetate, polyester and ABS resins. Meanwhile, the protective films 21 and 22 are preferably approximately 0.01 to 0.3 mm thick.

The substrate 10 having both surfaces 11 and 12 respectively covered with the protective films 21 and 22 is accommodated with it being turned on wrapped around a substrate feed shaft 41. The substrate 10 becomes an optical memory device through a plurality of processes such as a recording layer forming process station 42 of forming recording layers 111 on the surface 11 by feeding means such as rollers 45, 46 and 47, a guide track forming process station 43 for forming guide tracks on the substrate 10, a protective film stripping process station 48 for stripping the protective films 21 and 22 from the substrate 10 by take-up rollers, a cutting process staton 44 for cutting the substrate 10 by a cutter 441, and a protective layer forming processes station (not shown) using transparent synthetic resins. Meanwhile, the guide track forming process station 43 is formed by a pair of rollers arranged opposed to each other with the substrate 10 being interposed therebetween and rotatably provided in the forward direction and adapted to feed the substrate 10 through the recording layer forming process station 42 while pressurizing the same to transcribe patterns of irregular portions formed on a cylindrical surface of one of the rollers onto the substrate 10, thereby to continuously form guide tracks.

Furthermore, the cutting process station 44 is formed by a pair of rollers arranged opposed to each other with the substrate 10 being interposed therebetween and rotatably provided and adapted to feed the substrate 10 while pressurizing the same to cut optical memory devices in the shape corresponding to the shape of cutting edge portions formed on a cylindrical surface of one of the rollers by punching to sequentially drop the optical memory devices cut by punching from hole portions, corresponding to the cutting edge portions, on the other roller.

Additionally, a delivery belt is movingly provided in a cavity portion formed in the above described other roller. The above described optical memory devices cut by punching are dropped on this delivery belt to be disposed thereon, and the optical memory devices are sequentially conveyed to a not-shown coating processing station.

In the recording layer forming process station 42, the protective film 21 functions as a mask. Thus, the recording layers 111 are formed in only those portions, corresponding to the openings 211, of the substrate 10 by suitable means such as sputtering and evaporation. More specifically, the recording layers 111 are not formed in portions other than the openings 211 because they are covered with the protective film 21.

Although in the above described embodiment, description was made on a case in which the openings 211 are previously provided on the protective film 21, openings can be formed by cutting away cuts corresponding to the openings 211, which has been provided on the protective film 21, immediately before the substrate 10 is inserted into the manufacturing apparatus. In this case, the possibility of contamination of the substrate 10 is further reduced.

Additionally, the order of the above described five processes, that is, the recording layer forming process, the guide track forming process, the protective film stripping process, the cutting process and the protective layer forming process, is not fixed but can be arbitrarily changed.

An optical memory device manufactured using this substrate with the protective film includes an optical card, an optical disc or the like, and it is particularly preferable for the optical card requiring quantity production and low cost.

In the substrate with a protective film for manufacturing an optical memory device according to the present invention, the surfaces of which are previously covered with protective films functioning as a mask, no seperate mask is required at the time of manufacturing an optical memory device. Accordingly, if this substrate is a flexible substrate, optical memory devices can be continuously manufactured and, consequently, production efficiency can be increased to reduce cost.

What is claimed is:

1. A substrate for manufacturing an optical memory device, one surface of the substrate being covered with a protective film provided with openings only in portions corresponding to recording layers to be formed on the substrate, thereby allowing the protective film to function as a mask for forming the recording layers in a recording layer forming process.

2. The substrate according to claim 1, in which one surface of the substrate is covered with the protective film provided with the openings and the other surface is covered with a protective film without the openings.

3. The substrate according to claim 1, in which the substrate is formed of polycarbonate, acrylic or polyolefin, and the protective film is formed of vinyl, polyethylene, nylon, Duracon, polypropylene, acetate, polyester or ABS resins.

4. a method of manufacturing an optical memory device, which comprises the steps of continuously feeding a substrate covered with a protective film provided with openings only in portions corresponding to recording layers to be formed on the substrate, forming the recording layers through the openings on the substrate, forming guide tracks on the substrate, stripping the protective film from the substrate, cutting the substrate to a predetermined size, and forming a protective layer on the substrate.

* * * * *